(12) United States Patent
Zheng et al.

(10) Patent No.: US 10,891,241 B2
(45) Date of Patent: *Jan. 12, 2021

(54) CACHE MEMORY THAT SUPPORTS TAGLESS ADDRESSING

(71) Applicant: Rambus Inc., Sunnyvale, CA (US)

(72) Inventors: Hongzhong Zheng, Sunnyvale, CA (US); Trung A. Diep, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/149,553

(22) Filed: Oct. 2, 2018

(65) Prior Publication Data

US 2019/0102318 A1    Apr. 4, 2019

Related U.S. Application Data

(63) Continuation of application No. 13/807,095, filed as application No. PCT/US2011/045254 on Jul. 25, 2011, now Pat. No. 10,133,676.

(Continued)

(51) Int. Cl.
*G06F 12/00* (2006.01)
*G06F 12/1045* (2016.01)
(Continued)

(52) U.S. Cl.
CPC ...... *G06F 12/1063* (2013.01); *G06F 12/0802* (2013.01); *G06F 12/1009* (2013.01); *G06F 12/1054* (2013.01)

(58) Field of Classification Search
CPC ............ G06F 12/1063; G06F 12/0802; G06F 12/1009; G06F 12/1054
See application file for complete search history.

(56) References Cited

U.S. PATENT DOCUMENTS 5,325,508 A   6/1994   Parks et al.
5,412,787 A   5/1995   Forsyth et al.
(Continued)

OTHER PUBLICATIONS

International Search Report and Written Opinion dated Feb. 29, 2012 re Int'l Application No. PCT/US2011/045254. 9 pages.

*Primary Examiner* — Gurtej Bansal
(74) *Attorney, Agent, or Firm* — Marc P. Schuyler

(57) ABSTRACT

The disclosed embodiments relate to a computer system with a cache memory that supports tagless addressing. During operation, the system receives a request to perform a memory access, wherein the request includes a virtual address. In response to the request, the system performs an address-translation operation, which translates the virtual address into both a physical address and a cache address. Next, the system uses the physical address to access one or more levels of physically addressed cache memory, wherein accessing a given level of physically addressed cache memory involves performing a tag-checking operation based on the physical address. If the access to the one or more levels of physically addressed cache memory fails to hit on a cache line for the memory access, the system uses the cache address to directly index a cache memory, wherein directly indexing the cache memory does not involve performing a tag-checking operation and eliminates the tag storage overhead.

20 Claims, 13 Drawing Sheets

| PAGE-TABLE ENTRY | TLB ENTRY | PHYSICAL PAGE ADDRESS VALID IN MAIN MEMORY | MICRO-PAGE ADDRESS VALID IN CACHE MEMORY | TLB ACCESS RESULT | PAGE-TABLE ACCESS RESULT |
|---|---|---|---|---|---|
| VALID | VALID | YES | YES | TLB HIT | PAGE-TABLE HIT |
| VALID | INVALID | YES | NO | TLB MISS | |
| INVALID | VALID | N/A | N/A | N/A | N/A |
| INVALID | INVALID | NO | NO | TLB MISS | PAGE FAULT |

Related U.S. Application Data

(60) Provisional application No. 61/368,515, filed on Jul. 28, 2010.

(51) Int. Cl.
    *G06F 12/0802*    (2016.01)
    *G06F 12/1009*    (2016.01)

(56) References Cited

U.S. PATENT DOCUMENTS

| | | |
|---|---|---|
| 5,479,627 A | 12/1995 | Lisimaque et al. |
| 5,542,062 A | 7/1996 | Taylor et al. |
| 6,324,634 B1 | 11/2001 | Yoshioka et al. |
| 6,732,250 B2 | 5/2004 | Durrant |
| 7,743,215 B2 | 6/2010 | Okawa et al. |
| 2003/0014606 A1* | 1/2003 | Arimilli ................. G06F 13/28 711/167 |
| 2004/0117591 A1 | 6/2004 | Arimilli et al. |
| 2005/0102473 A1* | 5/2005 | Sakata ................ G06F 12/1054 711/122 |
| 2006/0026355 A1 | 2/2006 | Okawa et al. |
| 2006/0212675 A1* | 9/2006 | Sartorius ............ G06F 12/1027 711/205 |
| 2007/0150665 A1 | 6/2007 | Arimilli et al. |
| 2008/0256303 A1* | 10/2008 | Croxford ............ G06F 12/1027 711/144 |
| 2010/0023692 A1 | 1/2010 | Jouppi |
| 2010/0332727 A1 | 12/2010 | Kapil et al. |
| 2013/0304991 A1 | 11/2013 | Bottcher et al. |
| 2014/0164748 A1 | 6/2014 | Dundas |

\* cited by examiner

| PAGE-TABLE ENTRY | TLB ENTRY | PHYSICAL PAGE ADDRESS VALID IN MAIN MEMORY | MICRO-PAGE ADDRESS VALID IN CACHE MEMORY | TLB ACCESS RESULT | PAGE-TABLE ACCESS RESULT |
|---|---|---|---|---|---|
| VALID | VALID | YES | YES | TLB HIT | PAGE-TABLE HIT |
| VALID | INVALID | YES | NO | TLB MISS | |
| INVALID | VALID | N/A | N/A | N/A | N/A |
| INVALID | INVALID | NO | NO | TLB MISS | PAGE FAULT |

FIG. 5A

| PAGE-TABLE ENTRY | TLB ENTRY | CTLB ENTRY | PHYSICAL PAGE ADDRESS VALID IN MAIN MEMORY | MICRO-PAGE ADDRESS VALID IN CACHE MEMORY | TLB ACCESS RESULT | CTLB ACCESS RESULT | PAGE-TABLE ACCESS RESULT |
|---|---|---|---|---|---|---|---|
| VALID | VALID | VALID | YES | YES | TLB HIT | CTLB HIT | PAGE-TABLE HIT |
| VALID | VALID | INVALID | N/A | N/A | N/A | N/A | N/A |
| VALID | INVALID | VALID | N/A | N/A | N/A | N/A | N/A |
| VALID | INVALID | INVALID | YES | NO | TLB MISS | CTLB MISS | PAGE-TABLE HIT |
| INVALID | VALID | VALID | N/A | N/A | N/A | N/A | N/A |
| INVALID | VALID | INVALID | N/A | N/A | N/A | N/A | N/A |
| INVALID | INVALID | VALID | N/A | N/A | N/A | N/A | N/A |
| INVALID | INVALID | INVALID | NO | NO | TLB MISS | CTLB MISS | PAGE FAULT |

FIG. 5B

CACHE MEMORY THAT SUPPORTS TAGLESS ADDRESSING

RELATED CASES

This document is a continuation of U.S. patent application Ser. No. 13/807,095, filed on Dec. 27, 2012 as a national stage entry of International Patent Application No. PCT/US2011/045254, filed on Jul. 25, 2011; U.S. patent application Ser. No. 13/807,095 is hereby incorporated by reference. Each of these applications claims the benefit of U.S. Provisional Application No. 61/368,515, filed Jul. 28, 2010 for "cache memory that supports tagless addressing."

TECHNICAL FIELD

The disclosed embodiments generally relate to the design of memories for computer systems. More specifically, the disclosed embodiments relate to the design of a memory system that includes a directly addressed cache memory.

BACKGROUND

In computer system cache memory designs, a cache is addressed using lower-order bits of the physical address while the higher-order bits are stored in a tag field, since the size of the cache is a small fraction of the size of the entire physical address space of the system. During a memory reference, a cache line's tag is compared against the memory reference's address to determine whether the memory reference is a cache hit. As the size of caches grows, the number of cache lines expands correspondingly, and the tag storage for these cache lines increases proportionately. For example, as conventional caches increase in size to multiple gigabytes, the associated cache tags can potentially occupy hundreds of megabytes. To reduce cache tag-matching latency, it is useful to locate these cache tags on a processor chip. However, it may not be cost effective to store hundreds of megabytes of cache tags on-chip. On the other hand, storing the cache tags off-chip introduces additional latency for tag lookups and also consumes valuable bandwidth.

BRIEF DESCRIPTION OF THE FIGURES

FIG. 5A presents a table which illustrates conditions that are indicated by a valid/invalid TLB entry and a valid/invalid page-table entry in accordance with the disclosed embodiments.

FIG. 5B presents a table which illustrates conditions that are indicated by a valid/invalid TLB entry, a valid/invalid CTLB entry and a valid/invalid page-table entry in accordance with the disclosed embodiments.

DETAILED DESCRIPTION

The disclosed embodiments relate to methods and apparatus for a cache memory design. In embodiments described below, this new cache memory design may utilize packaging technologies, such as die stacking, and through-silicon vias (TSVs), which enable memory chips to be placed in extremely close proximity to processor chips. Moreover, these proximate memory chips effectively comprise a new level in a memory hierarchy which resides between the last level of on-chip cache memory and main memory, for example dynamic random-access memory (DRAM).

Figure 1:
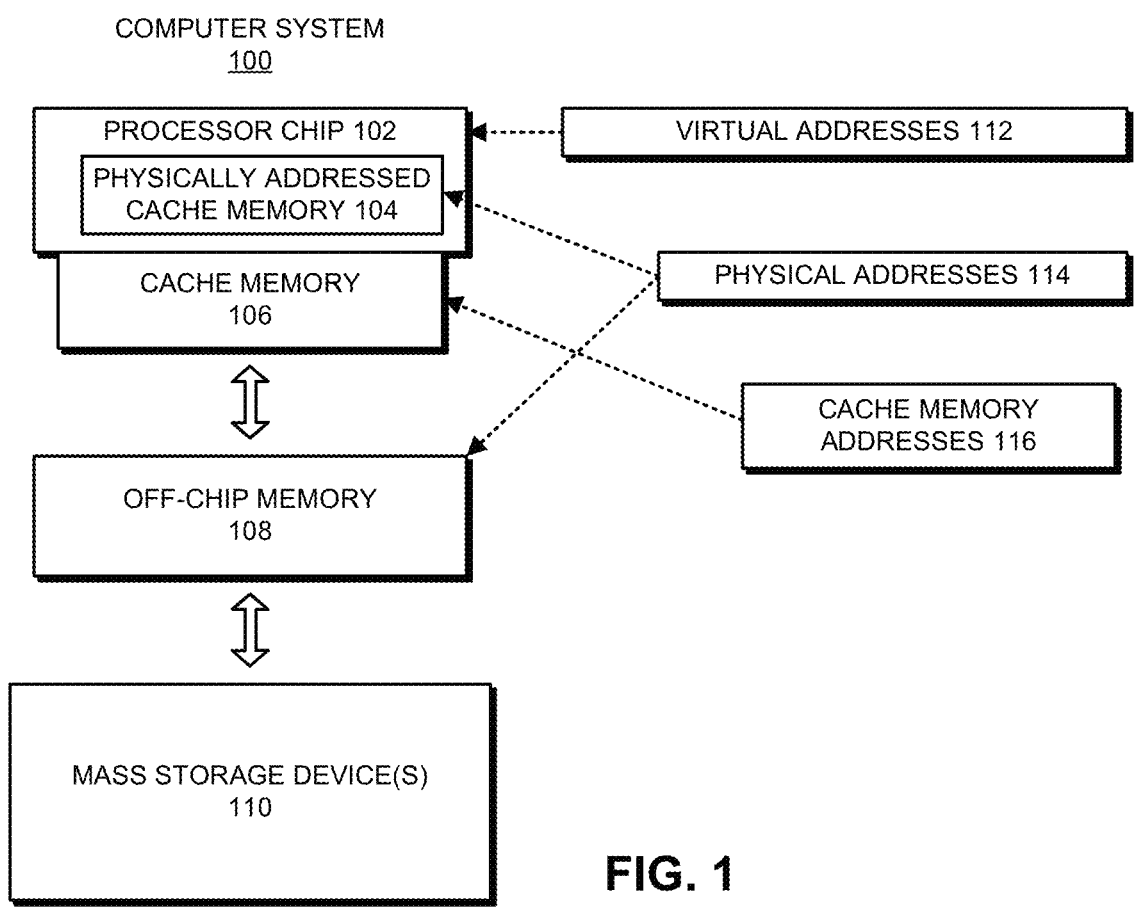
FIG. 1 illustrates a memory hierarchy in a computer system in accordance with the disclosed embodiments.

For example, FIG. 1 illustrates a memory hierarchy in a computer system 100 in accordance with the disclosed embodiments. This memory hierarchy includes a processor chip 102, which contains one or more processor cores. (The term "processor chip" can refer to a semiconductor chip that contains one or more processor cores, associated caches and address-translation circuitry.) This processor chip 102 also includes one or more levels of physically addressed cache memory 104 (which possibly includes virtually indexed, physically tagged L1 caches). These on-chip cache memories 104 can include L1, L2 and L3 caches, which can be anywhere in size from as small as a few kilobytes to as large as tens and possibly hundreds of megabytes. These on-chip cache memories 104 store cache lines which have recently been accessed or are likely to be accessed in the near future.

Processor chip 102 is coupled to another cache memory 106 comprising one or a number of memory chips which, in an embodiment, are located in close proximity to processor chip 102. This close proximity can be achieved by using a number of different techniques and structures, such as die-stacking and/or TSVs. An exemplary cache memory 106 can be 1 to 16 gigabytes or more in size and can have an access time of between 25 and 50 nanoseconds. (Note that in other embodiments cache memory 106 can be smaller than 1 gigabyte or larger than 16 gigabytes, and the access time to cache memory 106 can be less than 25 nanoseconds or more than 50 nanoseconds.) Although in some embodiments the memory chips in cache memory 106 are stacked, in other embodiments the memory chips can be arranged in other configurations.

A memory controller, for example, located on processor chip 102, directs cache lines between cache memory 106 and a larger off-chip memory 108 which, for example, can comprise a number of dynamic random-access memory (DRAM) chips. This larger off-chip memory 108 can be, for example, 128 to 512 gigabytes in size, and can have an access time of about 100 nanoseconds. Finally, an input/ output (I/O) controller directs data between off-chip memory 108 and mass storage device(s) 110, which comprise one or more non-volatile storage devices, such as disk drives or other non-volatile storage devices. Mass storage device(s) 110 can possibly store many terabytes of code and/or data, and can have an access time measured in microseconds or even milliseconds.

As illustrated on the right-hand side of FIG. 1, different types of addressing schemes are used to access the different levels of the memory hierarchy. The one or more processor cores within the processor chip 102 execute code which manipulates virtual addresses 112. During execution of the code, these virtual addresses 112 are translated into both physical addresses 114 and cache memory addresses 116. The physical addresses 114 are used to access the physically addressed cache memories 104 which are located on processor chip 102, and also to access off-chip memory 108. In contrast, the cache memory addresses 116 are used to directly index cache memory 106. (The term "directly index" means that the cache memory is indexed without performing a tag-checking operation.)

By directly indexing cache memory 106 as opposed to accessing a conventional cache memory using tags, an additional tag lookup is avoided and there is no longer a need to provide tag storage. However, managing cache memory 106 involves some amount of effort to maintain a separate address space, and to carefully map portions of virtual pages to "micro-pages" in cache memory 106. A micro-page is a portion of a virtual page which can be independently managed within cache memory 106. (For example, a micro-page can be independently: accessed in cache memory 106; inserted into cache memory 106; and/or replaced in cache memory 106.) As will be described in more detail below, the mapping of micro-pages to cache memory addresses can be managed by the paging system.

The blocks in mass storage device(s) 110 are accessed by making block-level requests, and are generally not mapped to specific memory addresses. However, in some cases, the virtual memory system can possibly move unused pages of virtual memory into a swap space located in mass storage device(s) 110, and these virtual pages located in swap space can be associated with specific virtual page addresses.

Virtual Address Translation

Figure 2A:
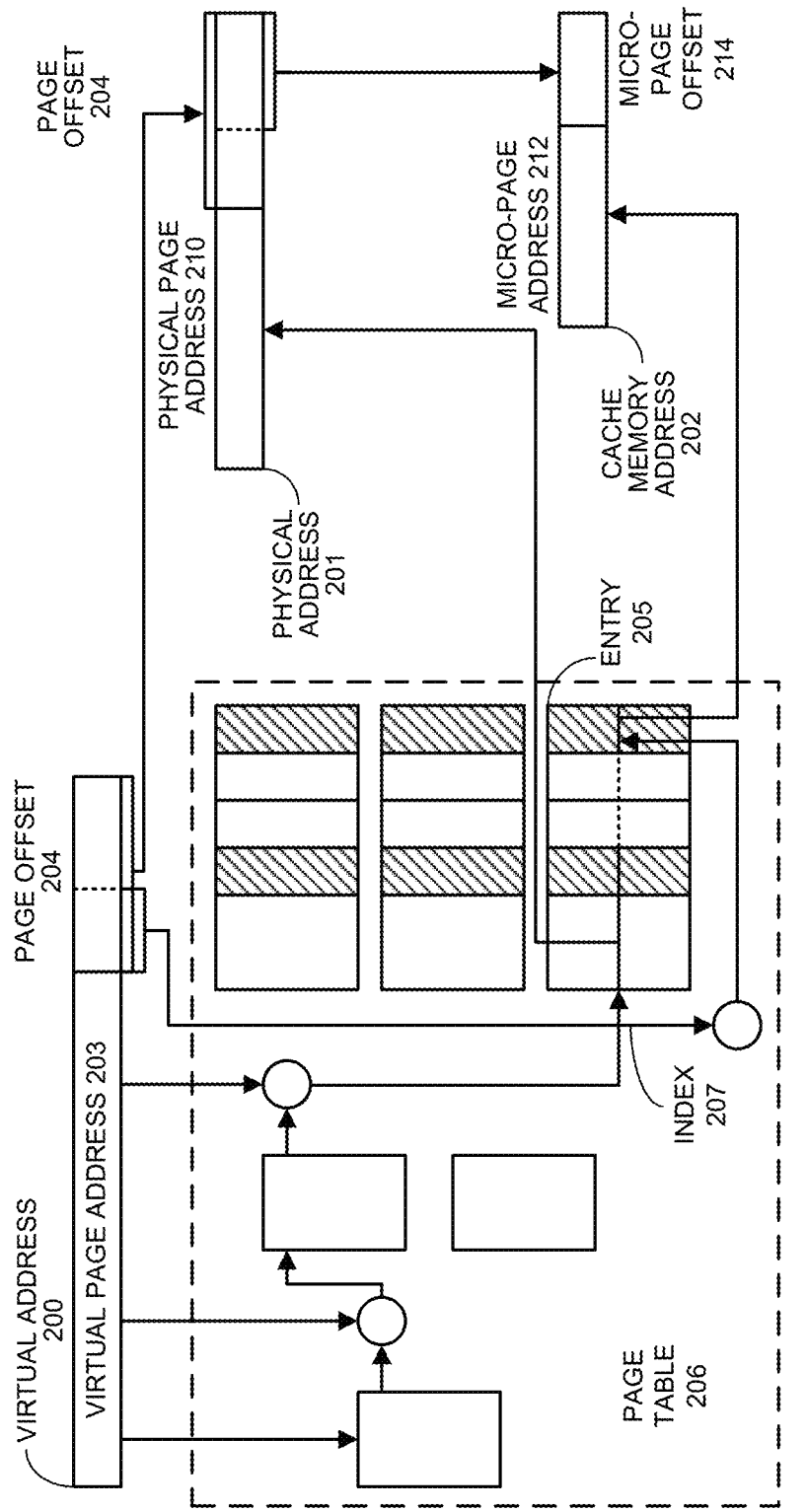
FIG. 2A illustrates how a virtual address can be translated into both a physical address and a cache memory address in accordance with the disclosed embodiments.

FIG. 2A illustrates how a virtual address can be translated into both a physical address and a cache memory address in accordance with the disclosed embodiments. In an embodiment, this address-translation process involves modifications to conventional software structures, such as page tables, and conventional hardware structures, such as translation-lookaside buffers, as is described in more detail below.

During program execution, a virtual address 200 is received for a memory reference, wherein the virtual address 200 is comprised of a virtual page address 203 and a page offset 204. (In an exemplary embodiment, virtual address 200 includes 64 bits, virtual page address 203 includes 42 bits, and page offset 204 includes 12 bits.) Virtual page address 203 is used to look up an entry 205 in a hierarchical page table 206. This entry 205 includes a physical page address 210, which is prepended to page offset 204 to produce physical address 201, as is illustrated on the right-hand side of FIG. 2A.

The virtual page, which is indexed by virtual page address 203, is comprised of a number of micro-pages that can be mapped to corresponding micro-page locations in cache memory 106. To facilitate this mapping, the page-table entry 205 also includes a number of micro-page addresses. More specifically, an index 207, comprising higher-order bits of page offset 204, is used to select a specific micro-page address 212 from entry 205. This selected micro-page address 212 is prepended to a micro-page offset 214, comprising the remaining lower-order bits of page offset 204, to produce a cache memory address 202. Cache memory address 202 is then used to directly index cache memory 106 as is described in more detail below. In an exemplary embodiment, index 207 comprises 6 bits which are used to index one of 64 possible micro-pages.

TLB Structure

Figure 2B:
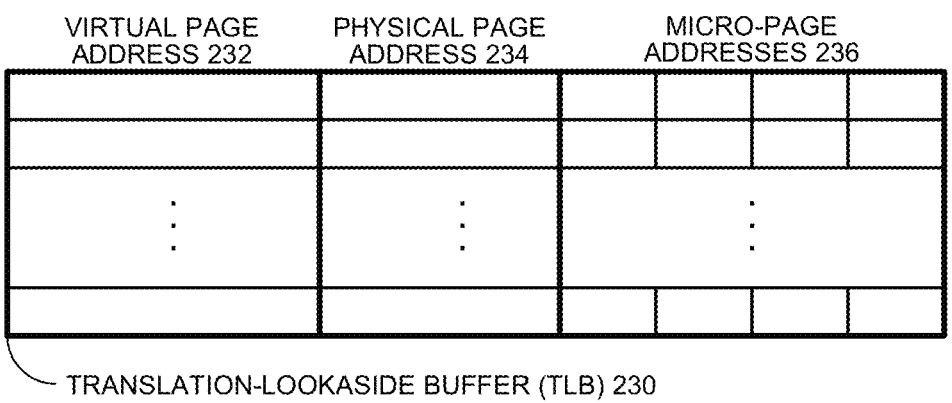
FIG. 2B illustrates the structure of a corresponding translation-lookaside buffer (TLB) in accordance with the disclosed embodiments.

To speed up the address-translation process, a number of recently used page-table entries are cached in a hardware lookup structure in accordance with an embodiment. This hardware lookup structure is referred to as a "translation-lookaside buffer" (TLB) and is illustrated in FIG. 2B. A TLB is generally implemented as a fully associative cache and, in specific embodiments is located on the processor chip to improve lookup performance.

As illustrated in FIG. 2B, each entry in TLB 230 includes a virtual page address 232, a corresponding physical page address 234 and a number of micro-page addresses 236. Although the TLB entries illustrated in FIG. 2B include 4 micro-page addresses, other embodiments can include more or fewer micro-page addresses depending upon how many micro-pages are associated with each virtual page. For example, an exemplary embodiment uses 4K-byte pages and 64-byte micro-pages, wherein each virtual page is divided into 64 micro-pages. Thus, in this embodiment each page-table entry or TLB entry includes 64 micro-page addresses.

In summary, one embodiment of a TLB includes a circuit that receives a virtual address for a memory access. It also includes a plurality of memory elements that store a plurality of TLB entries, wherein each of these TLB entry includes: a virtual page address; a physical page address; and one or more micro-page addresses associated with one or more micro-pages that comprise a virtual page associated with a virtual page address. The TLB also includes a set of comparators configured to compare a virtual page address for the memory reference against virtual page addresses in the plurality of TLB entries to determine whether the plurality of TLB entries includes a TLB entry which is associated with the virtual address. The TLB additionally includes a circuit that provides a physical address and a micro-page address from a TLB entry associated with the memory reference.

Another embodiment includes both a conventional TLB, which maps virtual addresses to physical addresses, and a cache-address TLB (CTLB), which maps physical addresses to micro-page addresses. The structure of a CTLB is illustrated in FIG. 2C.

Figure 2C:
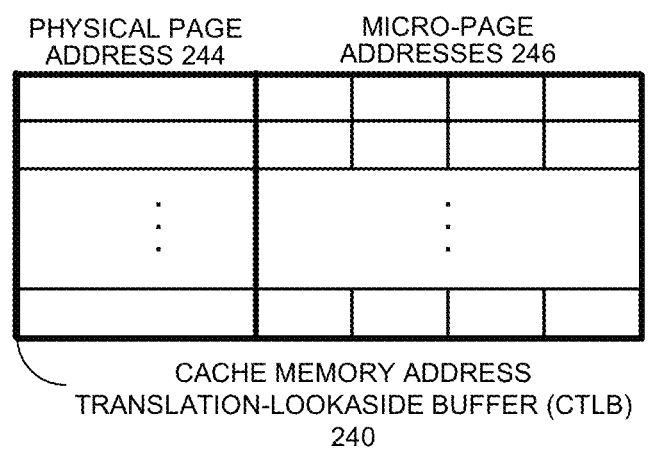
FIG. 2C illustrates the structure of a cache memory address TLB (CTLB) in accordance with the disclosed embodiments.

As illustrated in FIG. 2C, each entry in CTLB 240 includes a physical page address 244 and a number of micro-page addresses 246. Because the cache memory address is only required after all higher level caches miss, the timing requirement is a more relaxed for a cache memory address lookup in comparison to lookups in caches in other levels. A CTLB can provide more entries for caching cache memory address translations and can alleviate the timing requirements of the design. Although the CTLB entries illustrated in FIG. 2C include 4 micro-page addresses, other embodiments can include more or fewer micro-page addresses depending upon how many micro-pages are associated with each virtual page. For example, one exemplary embodiment uses 4K-byte pages and 64-byte micro-pages, wherein each virtual page is divided into 64 micro-pages.

Thus, in this embodiment each page-table entry or CTLB entry includes 64 micro-page addresses.

Using Address Bits from a Physical Address in a Cache Memory Address

If each page-table entry (or TLB entry) includes 64 micro-page addresses, the size of a page-table entry can become quite large. For example, in a system with 16 gigabytes of cache memory, 4K-byte virtual pages and 64-byte micro-pages, each cache memory address will be 34 address bits in length, and each micro-page offset will be 6 bits in length. Thus, each micro-page address will be 34−6=28 bits in length. Moreover, each page-table entry will include 4K/64=64 micro-page addresses. Thus, there are a total of 28×64=1792 micro-page address bits in each page-table entry.

Figure 3A:
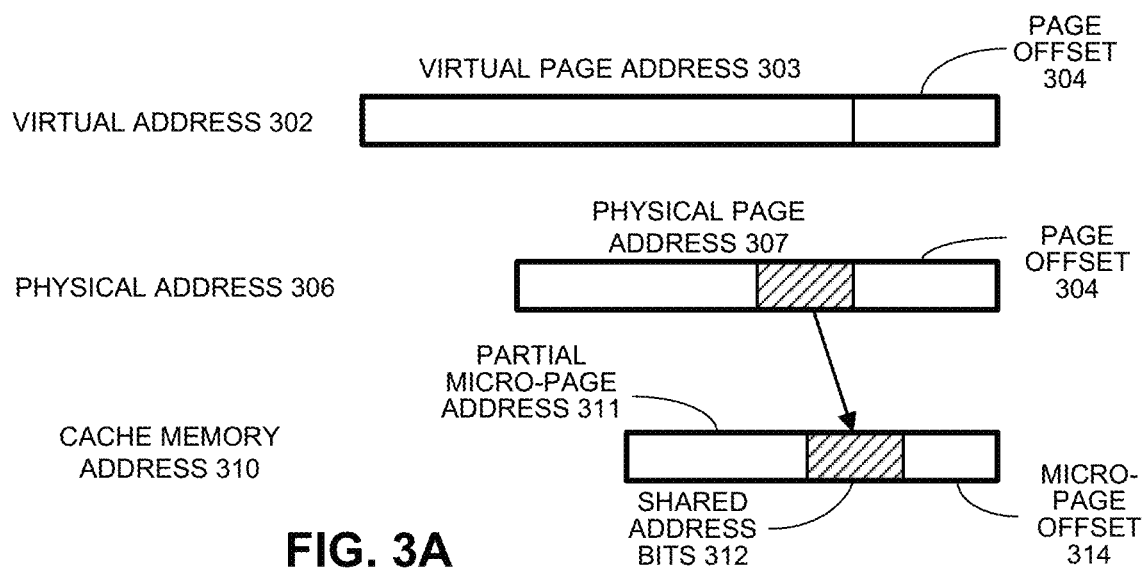
FIG. 3A illustrates how a cache memory address can share address bits with a physical address in accordance with the disclosed embodiments.

In an embodiment, this large number of micro-page address bits can be reduced by using some address bits from the physical address in each of the associated micro-page addresses for the same virtual page. For example, FIG. 3A illustrates how bits from a physical page address 307 can be used as shared address bits 312 in each micro-page address. Although in FIG. 3A these shared address bits 312 are illustrated as lower-order bits of a micro-page address and lower-order bits of physical page address 307, in general the shared address bits 312 can be any of the bits of physical page address 307 (either continuous or non-continuous), and can be used to replace any of the bits in the micro-page address (either continuous or non-continuous). By using shared address bits from physical page address 307 in each micro-page address, only a smaller partial micro-page address 311 needs to be stored in each page-table entry, which can significantly reduce the size of the page-table entry. However, using the same shared address bits 312 in each micro-page address limits the possible locations in which the micro-pages for a given virtual page can be stored.

Figure 3B:
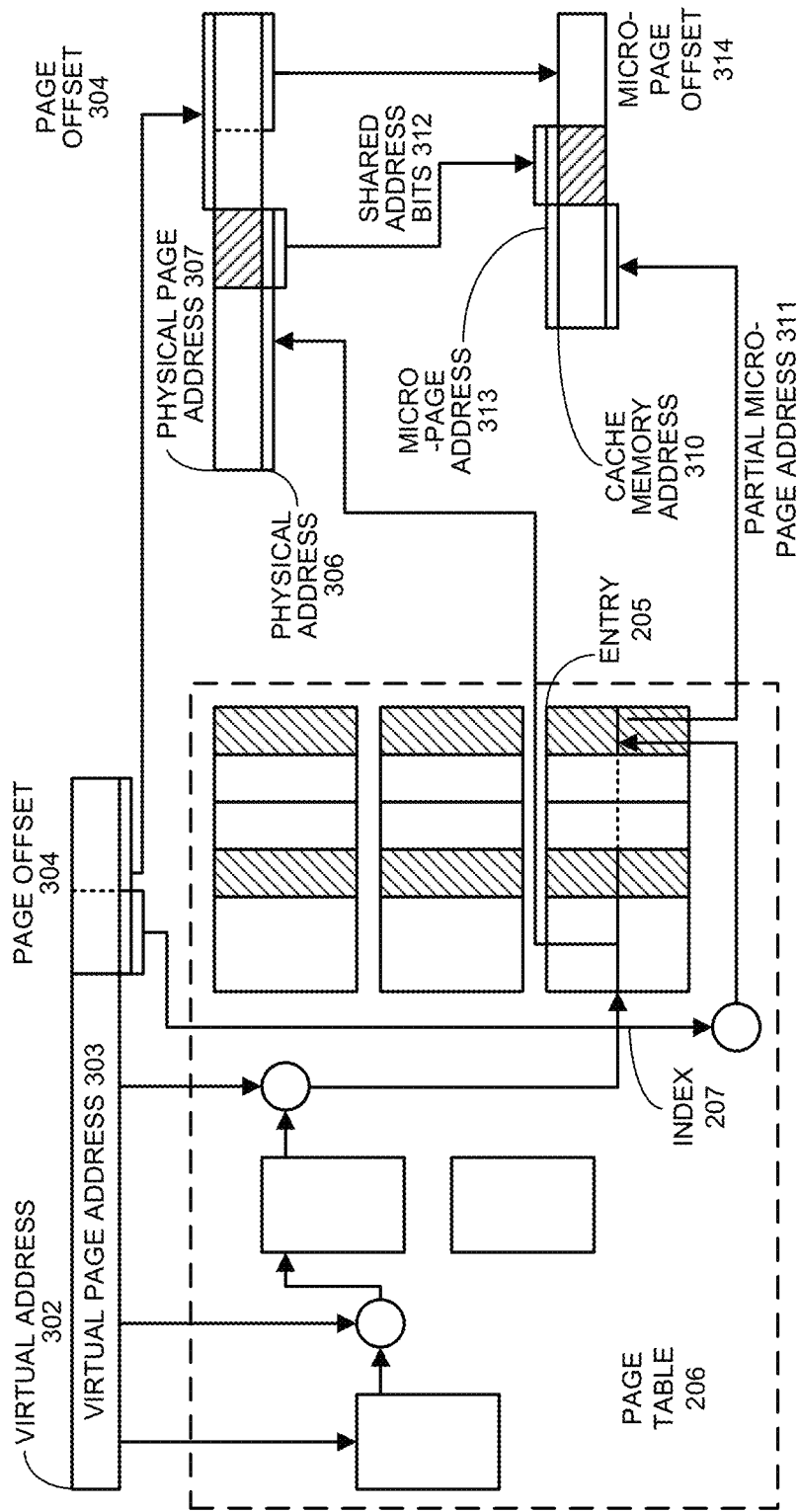
FIG. 3B illustrates the address-translation process when bits are shared between the physical address and the cache memory address in accordance with the disclosed embodiments.

This sharing of address bits slightly changes the address-translation process as is illustrated in FIG. 3B. (The details of the associated modifications to the hardware translation-lookaside buffer are discussed with reference to FIGS. 3C and 3D below.) Most of the address-translation process remains the same. However, after the physical page address 307 is retrieved from the page-table entry 205, a number of bits from physical page address 307 are used as shared address bits 312 in each micro-page address. For example, in FIG. 3B, the shared address bits 312 are combined with a smaller partial micro-page address 311 from the page-table entry to produce a cache memory address 310.

As mentioned above, the shared address bits 312 can generally be any of the address bits in physical page address 307. Moreover, the shared address bits 312 can be combined with the partial micro-page address 311 in a number of different ways. For example, the shared address bits 312 can be prepended, appended or interleaved with the partial-micro-page address 311.

Finally, after micro-page address 313 is produced, micro-page address 313 is prepended to micro-page offset 314 to produce a cache memory address 310.

Figure 3C:
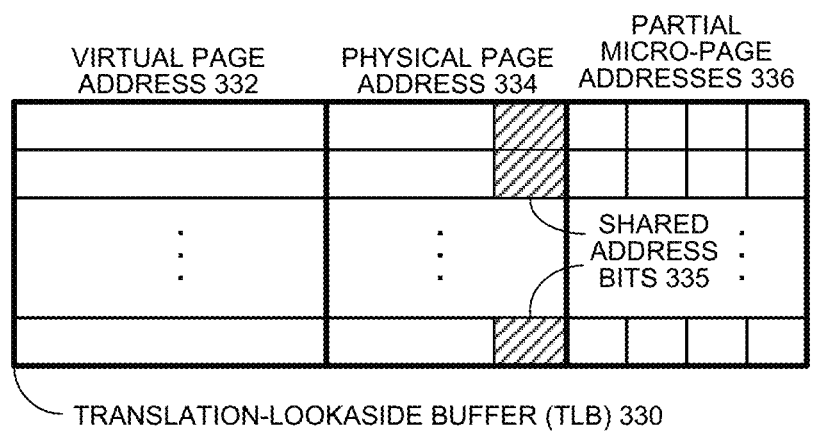
FIG. 3C illustrates the structure of a corresponding TLB in accordance with the disclosed embodiments.

FIG. 3C illustrates the structure of a TLB 330 in accordance with the disclosed embodiments. In FIG. 3C, like the TLB illustrated in FIG. 2B, each TLB entry includes a virtual page address 332 and a physical page address 334. However, instead of storing full micro-page addresses, the entry contains smaller partial micro-page addresses. Recall that a number of bits from the physical page address 334 are shared address bits 335, which are combined with one of the partial micro-page addresses 336 to produce a full micro-page address.

Figure 3D:
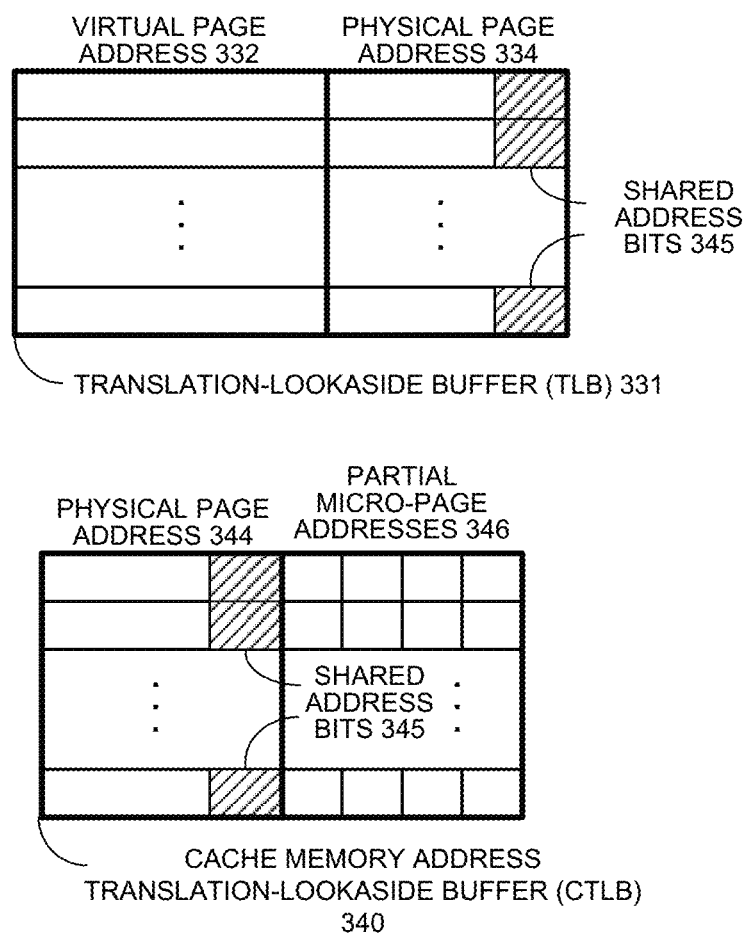
FIG. 3D illustrates the structure of a corresponding CTLB in accordance with the disclosed embodiments.

FIG. 3D illustrates the structure of a TLB 331 and an associated CTLB 340 in accordance with the disclosed embodiments. TLB 331 facilitates translating a virtual address into a physical address by caching entries containing a virtual page address 332 and a corresponding physical page address 334. Next, CLTB 340 facilitates translating a physical page address into a micro-page address by caching entries containing a physical page address 344 and partial micro-page addresses 346. However, note that instead of storing full micro-page addresses (as in FIG. 2C), each entry contains smaller partial micro-page addresses 346. These partial micro-page addresses 346 can be combined with shared address bits 345 from a corresponding physical page address 344 to produce a full micro-page address. More specifically, while accessing the cache memory after corresponding accesses to all preceding levels of physically addressed cache memory result in caches misses (wherein the lookups are based on a physical address obtained through a lookup in TLB 331), shared address bits 345 from a physical page address 344 in CTLB 340 are combined with one of the corresponding partial micro-page addresses 346 to produce a full micro-page address.

Address-Translation Process

Figure 4A:
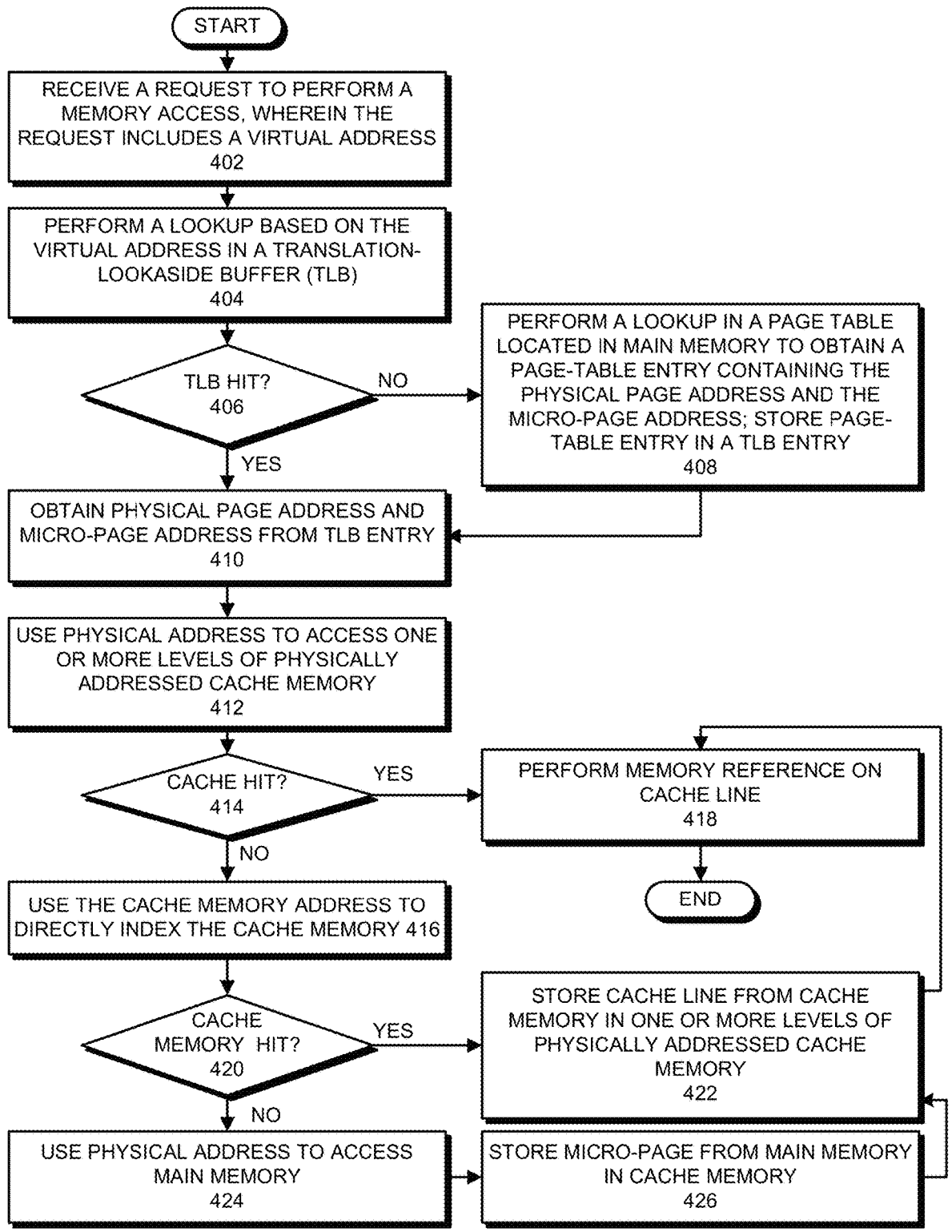
FIG. 4A presents a flow chart illustrating how address translation takes place during a memory access in accordance with the disclosed embodiments.

FIG. 4A presents a flow chart illustrating how address translation takes place during a memory access in accordance with the disclosed embodiments that use a TLB. During operation, the processor generates a request to perform a memory reference, wherein the request includes a virtual address (step 402). For example, the request can be a read or a write request which is directed to a specific memory location that is indexed by the virtual address. (Note that in an embodiment the "processor" refers to a chip that manages the memory access.) Next, the processor performs a lookup based on the virtual address in an on-chip TLB (step 404). The processor then determines whether the lookup generated a TLB hit (step 406).

If the lookup did not generate a TLB hit, the processor processes the resulting TLB miss, which involves performing a lookup in a page table located in main memory to obtain a corresponding page-table entry and then storing the page-table entry in the TLB, which may involve replacing an existing entry in the TLB (step 408). If a corresponding entry does not exist in the page table located in main memory, the processor can use virtual-memory-management techniques by generating a page fault to populate the page-table entry. For example, this may involve instantiating a new unmapped page of virtual memory, or moving a page of virtual memory from swap space on disk to main memory.

Next, if there was a TLB hit in step 406 (or if a new TLB entry was stored in step 408), the processor obtains a physical page address and a micro-page address which are associated with the virtual address from the TLB entry (step 410). The processor then combines the physical page address with the page offset to produce the physical address, and uses the physical address to access one or more levels of physically addressed cache memory (step 412). This can involve first accessing an L1 cache and, if necessary, an L2 cache and an L3 cache in an attempt to locate a cache line for the physical address. The processor then determines whether the accesses to the physically addressed cache memory produced a cache hit (step 414). If so, the processor performs the memory reference on the cache line (step 418) and the memory access is complete.

Otherwise, if the access to the physically addressed cache memory fails to produce a cache hit, the processor obtains a cache memory address, which was produced by combining the micro-page address (obtained from the TLB entry) with the micro-page offset (which is part of the page offset), and uses the cache memory address to directly index the cache memory (step 416). Note that this direct indexing does not involve a time-consuming tag-lookup operation. Moreover, there is no need to use valuable on-chip real estate to store cache tags for the cache memory. Next, the processor determines whether the access to the cache memory produced a hit (step 420). If so, the processor stores a cache line obtained in the micro-page of the cache memory in the one or more levels of physically addressed cache memory (step 422). The processor then performs the memory reference on the cache line (step 418) and the memory access is complete.

On the other hand, if the access to the cache memory did not access a valid micro-page, the physical address is used to access main memory (step 424). A micro-page obtained from main memory in the cache memory is then stored (step 426). This may involve first allocating a location in cache memory to accommodate the micro-page, which in turn may involve replacing an existing entry in the cache memory. This allocation and potential replacement can be facilitated by modifying software in the paging system to manage the cache memory in the same way that physical memory is managed. Thus, conventional data structures and conventional techniques which are presently used to manage physical pages in main memory can be used to keep track of which micro-pages are allocated in the cache memory, to prevent aliasing problems, and if necessary to decide which micro-page is to be evicted (replaced) from the cache memory.

Next, the processor stores a cache line obtained from the micro-page in the cache memory into the one or more levels of physically addressed cache memory (step 422). Finally, the processor performs the memory reference on the cache line (step 418).

Figure 4B:
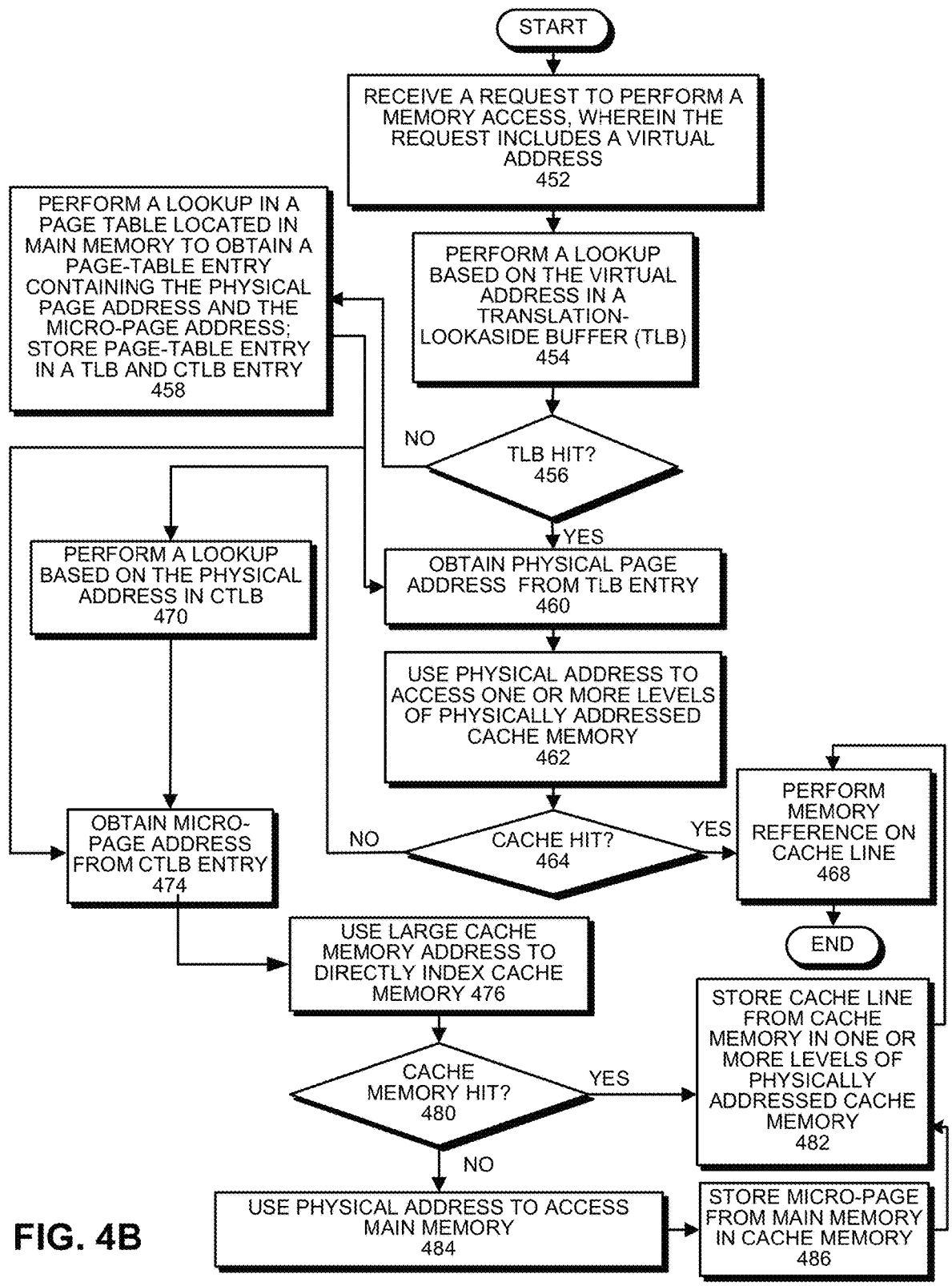
FIG. 4B presents a flow chart illustrating how address translation takes place during a memory access in accordance with the disclosed embodiments in a system with a TLB and a CTLB.

FIG. 4B presents a flow chart illustrating how address translation takes place during a memory access in accordance with the disclosed embodiments in a system with a TLB and a CTLB. During operation, the processor receives a request to perform a memory reference, wherein the request includes a virtual address (step 452). For example, the request can be a read or a write request which is directed to a specific memory location indexed by the virtual address. Next, the processor performs a lookup based on the virtual address in an on-chip TLB (step 454). The processor then determines whether the lookup generated a TLB hit (step 456).

If the lookup did not generate a TLB hit, the processor processes the resulting TLB miss in a conventional manner, which involves performing a lookup in a page table located in main memory to obtain a corresponding page-table entry. Then, the mapping of the virtual page address to the physical page address from the retrieved page table entry is stored in the TLB, and the mapping of the physical page address to the micro-page address from the retrieved page table entry is stored in the CTLB, which may involve replacing an existing entry in the TLB and in the CTLB (step 458). If a corresponding entry does not exist in the page table located in main memory, the processor can use conventional virtual-memory-management techniques to populate the page-table entry. For example, this may involve instantiating a new unmapped page of virtual memory, or moving a page of virtual memory from swap space on disk to main memory.

Next, if there was a TLB hit in step 456 (or if a new TLB entry was stored in step 458), the processor obtains a physical page address which is associated with the virtual address from the TLB entry (step 460). The processor then combines the physical page address with the page offset to produce the physical address, and uses the physical address to access one or more levels of physically addressed cache memory (step 462). This can involve first accessing an L1 cache and, if necessary, an L2 cache and an L3 cache in an attempt to locate a cache line for the physical address. The processor then determines whether the accesses to the physically addressed cache memory produced a cache hit (step 464). If so, the processor performs the memory reference on the cache line (step 468) and the memory access is complete. In one embodiment, for the case that allows parallel accesses to both directly indexed cache memory and physically addressed cache memory, if the access results in a physically addressed cache memory hit, then the respective access to directly indexed cache memory is canceled.

Otherwise, if the access to the physically addressed cache memory failed to produce a cache hit, the processor performs a lookup based on the physical address in an on-chip CTLB (step 470). Next, the processor obtains a micro-page address which is associated with the physical address from the CTLB entry (step 474).

The processor then produces a cache memory address by combining the micro-page address (obtained from the CTLB entry) with the micro-page offset (which is part of the page offset), and uses the cache memory address to directly index the cache memory (step 476). Note that this direct indexing does not involve a time-consuming tag-lookup operation. Moreover, there is no need to use valuable on-chip real estate to store cache tags for the cache memory. Next, the processor determines whether the access to the cache memory produced a hit (step 480). If so, the processor stores a cache line obtained in the micro-page of the cache memory into the one or more levels of physically addressed cache memory (step 482). The processor then performs the memory reference on the cache line (step 468) and the memory access is complete.

On the other hand, if the access to the cache memory did not access a valid micro-page, the processor uses the physical address to access main memory (step 484). The processor then stores a micro-page obtained from main memory in the cache memory (step 486). This may involve first allocating a location in cache memory to accommodate the micro-page, which in turn may involve replacing an existing entry in cache memory. This allocation and potential replacement can be facilitated by modifying software in the paging processor to manage the cache memory in the same way that physical memory is managed. Thus, conventional data structures and conventional techniques which are presently used to manage physical pages in main memory can be used to keep track of which micro-pages are allocated in the cache memory, to prevent aliasing problems, and if necessary to decide which micro-page is to be evicted (replaced) from the cache memory.

Next, the processor stores a cache line obtained from the micro-page in the cache memory into the one or more levels of physically addressed cache memory (step 482). Finally, the processor performs the memory reference on the cache line (step 468).

Status Information

FIG. 5A presents a table which illustrates conditions that are indicated by a valid/invalid TLB entry and a valid/invalid page-table entry in accordance with the disclosed embodiments. More specifically, FIG. 5A contains a row for each possible combination of the TLB entry being valid/invalid and the page-table entry being valid/invalid.

In the first row, both the page-table entry and the TLB entry are valid. This indicates that the physical page address is valid in main memory and the micro-page address is valid in the cache memory. In this case, a TLB access will result in a TLB hit, and a page-table access will result in a page-table hit. (However, note that if a memory reference hits in the TLB the memory reference will not cause a subsequent page-table access.)

In the second row, the page-table entry is valid and the TLB entry is invalid. This indicates that the physical page address is valid in main memory. However, the micro-page address is invalid in the cache memory. In this case a TLB access will result in a TLB miss, and a page-table access will result in a page-table hit.

In the third row, the page-table entry is invalid and the TLB entry is valid. This case never actually occurs, because the processor ensures that a TLB entry is valid only if a valid page-table entry exists. Thus, the rest of the third row is filled in with not-applicable (N/A) values.

In the fourth row, both the page-table entry and the TLB entry are invalid. This indicates that the physical page address is invalid in main memory and the micro-page address is invalid in the cache memory. In this case, a TLB access will result in a TLB miss, and a page-table access will result in a page fault, which will eventually cause the page-table entry to be instantiated and filled.

FIG. 5B presents a table which illustrates conditions that are indicated by a valid/invalid TLB entry, a valid/invalid CTLB entry and a valid/invalid page-table entry in accordance with the disclosed embodiments. More specifically, FIG. 5B contains a row for each possible combination of the TLB entry being valid/invalid, the CTLB entry being valid/invalid and the page-table entry being valid/invalid.

In the first row, the page-table entry, the TLB entry and the CTLB entry are valid. This indicates that the physical page address is valid in main memory and the micro-page address is valid in the cache memory. In this case, a TLB access will result in a TLB hit, a CTLB access will result in a CTLB hit and a page-table access will result in a page-table hit. (However, note that if a memory reference hits in the TLB the memory reference will also hit in the CTLB, and the memory reference will not cause a subsequent page-table access.)

In the fourth row, the page-table entry is valid, the TLB entry is invalid and the CTLB entry is invalid. This indicates that the physical page address is valid in main memory. However, the micro-page address is invalid in the cache memory. In this case, a TLB access will result in a TLB miss, a CTLB access will result in a CTLB miss, and a subsequent page-table access will result in a page-table hit.

In the eighth row, the page-table entry, the TLB entry and the CTLB entry are invalid. This indicates that the physical page address is invalid in main memory and the micro-page address is invalid in the cache memory. In this case, a TLB access will result in a TLB miss, a CTLB access will result in a CTLB miss, and a subsequent page-table access will result in a page fault, which will eventually cause the page-table entry to be instantiated and filled.

(The cases illustrated in the second, third, fifth, sixth and seventh rows never actually occur, because the processor ensures that a TLB entry is valid only if a valid page-table entry exists, and the CTLB and TLB are updated concurrently. Thus, those rows are filled in with not-applicable (N/A) values.)

Processor Chip

Figure 6:
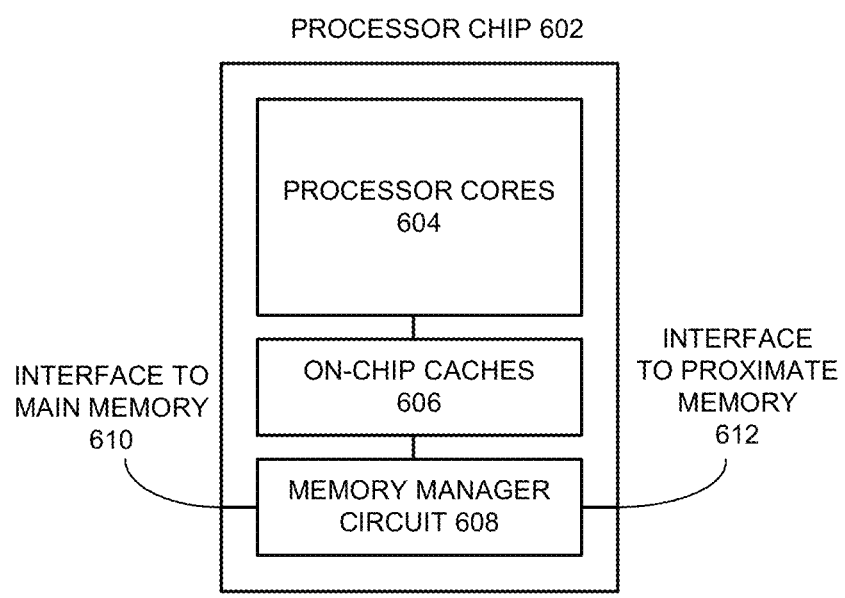
FIG. 6 illustrates a processor chip in accordance with the disclosed embodiments.

FIG. 6 illustrates a processor chip 602 in accordance with the disclosed embodiments. More specifically, in FIG. 6, processor chip 602 contains one or more processor cores 604 which access code and data stored in on-chip caches 606. These on-chip caches 606 can include L1 and/or L2 caches, and possibly an on-chip L3 cache. On-chip caches 606, in turn, communicate with a memory manager circuit 608, which manages the cache hierarchy in on-chip caches 606 and also directs data transfers between on-chip caches 606, a main memory (through main memory interface 610), and a proximate memory (though proximate memory interface 612). These data transfers are described in more detail with reference to FIGS. 1-5B above. Moreover, some or all of the functionality performed by memory manager circuit 606 may alternatively be performed in software, or some of the functionality may be moved to other chips.

Tradeoffs

In the above-described embodiments, each micro-page is 64 bytes in size, which matches the size of the cache lines in the on-chip caches. This simplifies the process of communicating blocks of data between the on-chip caches and the cache memory. However, in other embodiments, the size of a micro-page is larger than the size of a cache line (64 bytes), but smaller than a page size (4096 bytes). As the size of the micro-page increases, the number of micro-page addresses in each TLB/CTLB entry and page-table entry decreases, and micro-page replacements tend to be less frequent. However, transferring larger micro-pages between main memory and the cache memory can introduce additional latency, and can require additional bandwidth. Thus, the optimal size for a micro-page depends upon implementation-specific parameters, which can be determined empirically (for example, based on trace-driven simulations) for each specific implementation.

Also, in the embodiments in which physical address bits are shared with cache memory addresses, determining how many bits to share involves considering another tradeoff. Increasing the number of shared bits limits the possible mappings between cache memory addresses and corresponding physical and virtual addresses. However, at the same time, it reduces the size of each TLB/CTLB entry or page-table entry by reducing the size of each partial micro-page address. Again, the optimal number of bits to share depends upon implementation-specific parameters, which can be determined empirically for each specific implementation.

There is also a decision to be made about which physical address bits are to be shared, and then how the shared physical address bits are to be combined with the micro-page address bits. As mentioned above, the shared address bits can be prepended, appended or, more generally, interleaved with the partial micro-page address. These decisions can also be made based on empirical measurements.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above.

When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

We claim:

1. An apparatus comprising:
   circuitry to receive a virtual address in connection with a memory access request from a processor, and to translate the virtual address into a first address and a main memory address;
   circuitry to determine whether a first memory contains, at a location given by the first address, data corresponding to the virtual address; and
   circuitry to direct the main memory address to main memory in the event that the location in the first memory given by the first address does not contain the data corresponding to the virtual address.

2. The apparatus of claim 1, wherein the apparatus further comprises:
   a first translation look aside buffer;
   a second translation look aside buffer;
   circuitry to receive the virtual address and to access the first translation look aside buffer, to determine whether the first translation look aside buffer has an entry which links the main memory address to the virtual address and, if so, to responsively return the main memory address; and
   circuitry to receive the main memory address and to access the second translation look aside buffer, to determine whether the second translation look aside buffer has an entry which links the first address to the main memory address and, if so, to responsively return the first address.

3. The apparatus of claim 1, wherein the first address has first bits, the main memory address has second bits, and wherein the first bits are constrained to be equal in value to the second bits.

4. The apparatus of claim 1, wherein:
   the main memory address includes a page offset corresponding to a memory page;
   the first address comprises a micropage offset, corresponding to a non-exhaustive integer fraction of a page; and
   the first memory comprises storage for a plurality of micropage addresses, corresponding to the integer.

5. The apparatus of claim 1, wherein:
   the processor is on a chip having a first cache memory;
   said first memory is a second cache memory and the first address is an address in the second cache memory;
   the processor is to determine whether the data is in the first cache memory using a tag checking operation;
   said circuitry to determine whether the first memory contains the data is to determine, in the event of a cache miss in the first cache memory, whether the data is at a location directly indexed by the first address in the second cache memory; and
   if the data is not at the location directly indexed by the first address in the second cache memory, said circuitry to direct the main memory address to the main memory is to do so without said apparatus performing a tag checking operation in the second cache memory in association with the memory access request.

6. The apparatus of claim 1, wherein:
   said apparatus comprises the first memory;
   the chip is a first chip; and
   the first memory is on one or more second chips.

7. The apparatus of claim 6, wherein:
   the first chip has a first cache memory;
   said first memory is a second cache memory and the first address is an address in the second cache memory;
   the processor is to determine whether the data is in the first cache memory using a tag checking operation;
   said circuitry to determine whether the first memory contains the data is to determine, in the event of a cache miss in the first cache memory, whether the data is at a location directly indexed by the first address in the second cache memory; and
   if the data is not at the location directly indexed by the first address in the second cache memory, said circuitry to direct the main memory address to the main memory is to do so without said apparatus performing a tag checking operation in the second cache memory in association with the memory access request.

8. The apparatus of claim 7, wherein said first memory comprises dynamic random access memory (DRAM) and wherein said one or more second chips each comprise a DRAM chip.

9. The apparatus of claim 7, wherein the first cache memory is virtually indexed.

10. An apparatus comprising:
    a first memory comprising one or more dynamic random access memory (DRAM) chips;
    circuitry to receive a virtual address in connection with a memory access request from a processor, and to translate the virtual address into a first address and a main memory address;
    circuitry to determine whether the first memory contains, at a location directly indexed by the first address, data corresponding to the virtual address; and
    circuitry to direct the main memory address to main memory in the event that the location in the first memory given by the first address does not contain the data corresponding to the virtual address.

11. The apparatus of claim 10, wherein the apparatus further comprises:
    a first translation look aside buffer;
    a second translation look aside buffer;
    circuitry to receive the virtual address and to access the first translation look aside buffer, to determine whether the first translation look aside buffer has an entry which links the main memory address to the virtual address and, if so, to responsively return the main memory address; and
    circuitry to receive the main memory address and to access the second translation look aside buffer, to determine whether the second translation look aside buffer has an entry which links the first address to the main memory address and, if so, to responsively return the first address.

12. The apparatus of claim 10, wherein the first address has first bits, the main memory address has second bits, and wherein the first bits are constrained to be equal in value to the second bits.

13. The apparatus of claim 10, wherein the virtual address comprises a virtual page address and a first offset, wherein the first address comprises a page address in the first memory and a second offset, and wherein the main memory address comprises a page address in main memory and a third offset, and wherein the first offset has at least some bits that are constrained to have the same value as corresponding bits in the second offset and corresponding bits in the third offset.

14. The apparatus of claim 10, wherein:
the processor has a first cache memory;
said first memory is a second cache memory and the first address is an address in the second cache memory;
the processor is to determine whether the data is in the first cache memory using a tag checking operation; and
said circuitry to direct the main memory address to the main memory is to do so if the data is not in the first cache memory or at the location directly indexed by the first address in the second cache memory.

15. The apparatus of claim 14, wherein the processor is on a first chip independent from the one or more DRAM chips, wherein the first cache memory is on the first chip, and wherein said apparatus comprises the first chip.

16. The apparatus of claim 10, wherein the processor is on a chip independent from the one or more DRAM chips.

17. The apparatus of claim 16, wherein:
the chip independent from the one or more DRAM chips has a first cache memory;
said first memory is a second cache memory and the first address is an address in the second cache memory;
the processor is to determine whether the data is in the first cache memory using a tag checking operation; and
said circuitry to direct the main memory address to the main memory is to do so if the data is not in the first cache memory or at the location directly indexed by the first address in the second cache memory.

18. The apparatus of claim 17, wherein the first cache memory is virtually indexed.

19. An apparatus comprising:
circuitry to receive a virtual address in connection with a memory access request from a processor, and to translate the virtual address into a first address and a main memory address;
circuitry to determine whether a first memory contains, at a location given by the first address, data corresponding to the virtual address; and
circuitry to direct the main memory address to main memory in the event that the location in the first memory given by the first address does not contain the data corresponding to the virtual address;
wherein
the processor is on a chip having a first cache memory,
said first memory is a second cache memory, comprising one or more chips of dynamic random access memory (DRAM) and the first address is an address in the second cache memory,
the processor is to determine whether the data is in the first cache memory using a tag checking operation,
said circuitry to determine whether the first memory contains the data is to determine, in the event of a cache miss in the first cache memory, whether the data is at a location directly indexed by the first address in the second cache memory, and
if the data is not at the location directly indexed by the first address in the second cache memory, said circuitry to direct the main memory address to the main memory is to do so without said apparatus performing a tag checking operation in the second cache memory in association with the memory access request.

20. The apparatus of claim 19, wherein the apparatus further comprises:
a first translation look aside buffer;
a second translation look aside buffer;
circuitry to receive the virtual address and to access the first translation look aside buffer, to determine whether the first translation look aside buffer has an entry which links the main memory address to the virtual address and, if so, to responsively return the main memory address; and
circuitry to receive the main memory address and to access the second translation look aside buffer, to determine whether the second translation look aside buffer has an entry which links the first address to the main memory address and, if so, to responsively return the first address.

* * * * *